M. G. BERRIDGE.
SNOWPLOW.
APPLICATION FILED APR. 10, 1919.
1,336,016.
Patented Apr. 6, 1920.
2 SHEETS—SHEET 1.
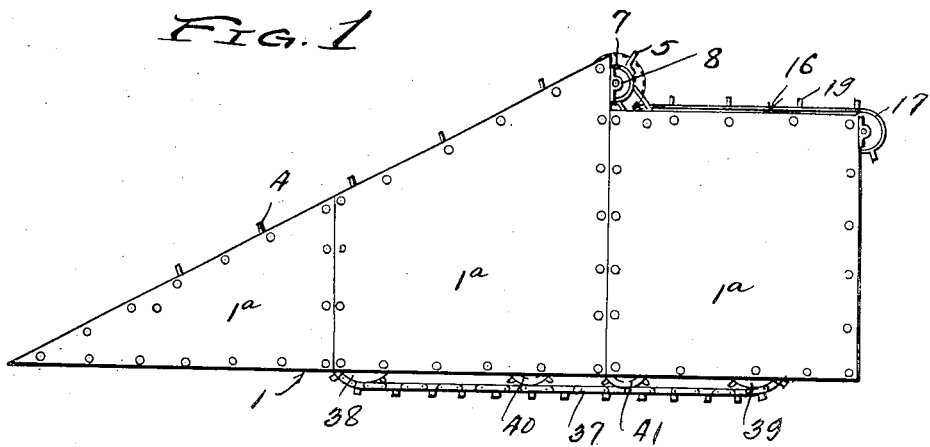
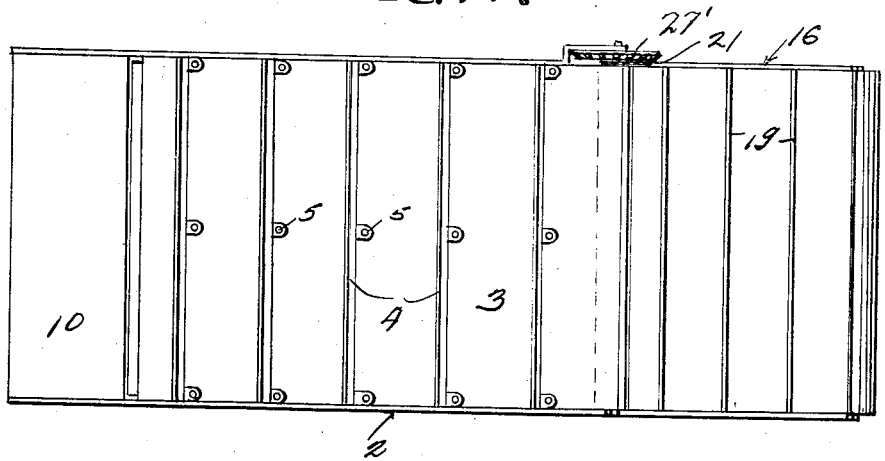

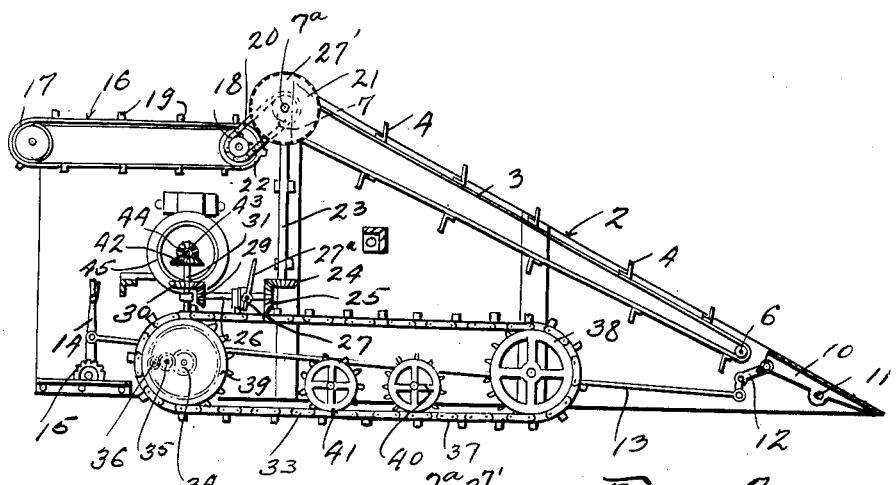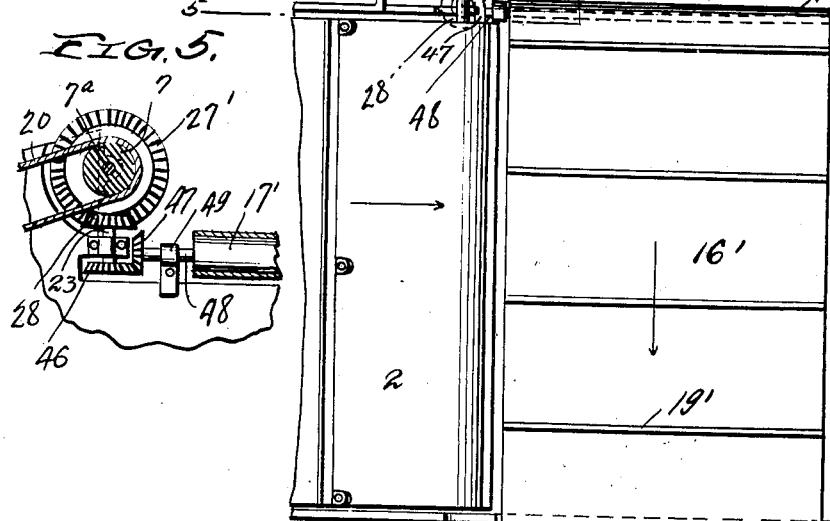

UNITED STATES PATENT OFFICE.

MASON G. BERRIDGE, OF DRYDEN, MICHIGAN.

SNOWPLOW.

1,336,016.  Specification of Letters Patent.  Patented Apr. 6, 1920.

Application filed April 10, 1919. Serial No. 288,979.

*To all whom it may concern:*

Be it known that I, MASON G. BERRIDGE, a citizen of the United States, residing at Dryden, in the county of Lapeer and State of Michigan, have invented certain new and useful Improvements in Snowplows, of which the following is a specification.

This invention relates to snow plows, and the object is to provide a simple, strong and efficient machine of this character which may be easily controlled and the point or shovel of which may be raised or lowered at the will of the operator.

Another object is to provide improved means for operating the elevating and conveying mechanism of the plow.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings;

Figure 1 represents a side elevation of a plow constructed in accordance with this invention, Fig. 2 is a plan view thereof, Fig. 3 is a side elevation with the casing or housing removed, taken from the side opposite to that shown in Fig. 1, Fig. 4 is a plan view showing a slightly different form of the invention, and Fig. 5 is a detail sectional view on the line 5—5 of Fig. 4.

In the embodiment illustrated in Figs. 1 to 3, an inclosing casing 1 is shown composed of suitable material, preferably sheet metal plates 1ª riveted together as is shown clearly in Fig. 1, and which completely encompasses and protects the operating mechanism of the plow. At the front of this casing between the side plates thereof is mounted a downwardly and forwardly inclined elevator 2 composed of canvas belting 3 or other suitable material of a width corresponding to the width of the plow and having mounted thereon longitudinally spaced, transversely extending strips 4 which are arranged at an incline to facilitate cleaning as will be hereinafter more fully described. These strips 4 as shown in Fig. 2 are provided with right angularly extending, apertured attaching lugs 5, any suitable means being used for connecting them to the canvas apron 3. This elevator runs over rollers 6 and 7 mounted respectively at the lower and upper ends of the front portion of the plow as is shown clearly in Fig. 3.

The point or shovel 10 is arranged in longitudinal alinement with the elevator 2 and in advance thereof, and is pivotally mounted as shown at 11 intermediately of its width. A bell crank 12 is fulcrumed on the supporting structure and one end has a pin and slot connection in the rear end of the point 10 while a rod 13 is pivotally connected with its other end (see Fig. 3). This rod 13 extends rearwardly to a point convenient the operator's seat, not shown, and is connected with a control lever 14 equipped with the usual pawl and rack 15 for locking it in adjusted position, it being obvious that when this lever is moved the point 10 may be raised or lowered at the will of the operator and locked in adjusted position.

The conveyer 16 is arranged at the rear of the elevator 2 in a plane below its upper end and which operates over rollers 17 and 18. This conveyer 16 is horizontally disposed and is provided with the usual strips 19 extending transversely thereof for holding the snow delivered thereon from the elevator and conveying it to a suitable point of deposit.

The conveyer 16 and the elevator 2 are connected by a sprocket chain 20 which passes over sprockets 21 and 22 carried by the rollers 7 and 18 so that the elevator and conveyer will move in unison.

A shaft 23 is supported in suitable bearings on the supporting frame or structure of the plow and as here shown is vertically disposed and equipped at its lower end with a bevel gear 24 which meshes with a similar gear 25 carried by the shaft 26 equipped with a clutch 27 for throwing the gear 25 into and out of operation with gear 24 for a purpose presently to be described. The upper end of shaft 23 has a bevel gear 28, which meshes with a similar gear 27' on shaft 7ª of roller 7 and by means of which motion is transmitted to the elevator 2 and conveyer 16. A bevel gear 29 is carried by the rear end of shaft 26 and meshes with a similar gear 30 carried by an upright shaft 31 and which receives rotary motion from a caterpillar gearing 33. This caterpillar gear 33 is of usual construction, being provided with a plurality of reducing gears 34, 35 and 36, the traction chain 37 of which passes around suitable sprockets 38 and 39. Suitable supporting sprockets 40 and 41 engage the lower stretch of the chain as is shown clearly in Fig. 3 and operate to hold it in engagement with the surface over which the plow passes. Shaft 31 has another bevel gear 42 at its upper end which meshes with a bevel gear 43 carried by a shaft 44 and operates to transmit motion to the roller or drum 45 through which other mechanism, not shown, is actuated.

A clutch actuating lever 27$^a$ is positioned convenient the seat of the operator so that the elevator and conveyer may be thrown into and out of action at the will of the operator.

In the use of this plow, the parts being in the position shown in Fig. 3, the operator may by shifting lever 14 raise or lower the shovel 10 to suitably position it for lifting snow and directing it on to the elevator 2. The snow shoveled up on this elevator 2 travels to the top of the plow and is delivered on to the conveyer 16 from which it is conducted to a suitable place of deposit. By shifting the clutch lever 27$^a$, the actuating means for the elevator and conveyer may be thrown into or out of operation so that the plow may move without actuating these members.

In the form shown in Figs. 4 and 5, the conveyer 16' is similar in construction to the conveyer 16 shown in the other figures, but is arranged transversely instead of longitudinally of the machine so that the snow delivered on to said conveyer from the elevator 2 will be deposited at one side of the track or road over which the plow is traveling.

This conveyer 16' is mounted on rollers 17' and 18' mounted in suitable bearings 49 and 50 at opposite sides of the plow, and the spindle 48 on which roller 17' is mounted carries at its front end a bevel gear 47. This bevel gear 47 meshes with a similar gear 46 on the shaft which carries the gear 28 so that motion is transmitted to the roller 17' through this gearing and is transmitted to the conveyer 16'.

The operation of the conveyer is otherwise the same as for the conveyer 16.

From the foregoing description, taken in connection with the accompanying drawings, the advantages of the construction and of the method of operation will be readily apparent to those skilled in the art to which the invention appertains and while I have described the principle of operation of the invention together with the device which I now conisder to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. In a snow plow a supporting structure, an inclosing casing inclined downwardly at its front end, an endless elevator mounted on said front end between the side walls of the casing and parallel with the tops of said walls, with a pivoted point in longitudinal alinement with the elevator and in advance thereof, a conveyer arranged in the rear of said elevator in a plane below its upper end; a caterpillar drive, a connection between said drive and said elevator and conveyer for operating the latter, and means for disconnecting the drive to permit the operation thereof without affecting the elevator or conveyer.

2. In a snow plow, a supporting structure, an inclosing casing inclined downwardly and forwardly at its front end, an endless elevator mounted on said front end between the side walls of the casing, with a pivoted point in longitudinal alinement with the elevator and in advance thereof, a conveyer arranged in the rear of said elevator in a plane below its upper end, a sprocket chain connected to drive said conveyer and elevator in unison, an upright shaft mounted on said structure and connected to operate said chain, a caterpillar drive, a connection between said drive and shaft whereby the shaft is actuated by the drive, and means for disconnecting said connection.

In testimony whereof I affix my signature in presence of a witness.

MASON G. BERRIDGE.

Witness:
DAYTON HOWELL.